(12) United States Patent
Duan et al.

(10) Patent No.: US 12,148,117 B2
(45) Date of Patent: Nov. 19, 2024

(54) CONTROL METHOD AND DEVICE FOR DISPLAYING 3D IMAGES

(71) Applicant: Lenovo (Beijing) Limited, Beijing (CN)

(72) Inventors: Yong Duan, Beijing (CN); Xi Wan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/360,788

(22) Filed: Jul. 27, 2023

(65) Prior Publication Data

US 2024/0037883 A1 Feb. 1, 2024

(30) Foreign Application Priority Data

Jul. 29, 2022 (CN) .......................... 202210908023.7

(51) Int. Cl.
*G06T 19/20* (2011.01)
*G06F 3/01* (2006.01)
*G06T 13/20* (2011.01)

(52) U.S. Cl.
CPC .............. *G06T 19/20* (2013.01); *G06F 3/013* (2013.01); *G06T 13/20* (2013.01); *G06T 2219/2012* (2013.01); *G06T 2219/2021* (2013.01)

(58) Field of Classification Search
CPC . G06T 19/20; G06T 13/20; G06T 2219/2012; G06T 2219/2021; G06F 3/013
See application file for complete search history.

(56) References Cited

U.S. PATENT DOCUMENTS

| | | | |
|---|---|---|---|
| 10,515,484 B1* | 12/2019 | Lucas | G06F 3/011 |
| 11,170,521 B1* | 11/2021 | Ben Himane | G06T 19/20 |
| 2011/0134117 A1* | 6/2011 | Uesaki | G06T 15/04 345/582 |
| 2011/0261048 A1* | 10/2011 | Lee | G06F 3/04845 345/173 |
| 2013/0076735 A1* | 3/2013 | Lee | H04N 13/378 345/87 |
| 2013/0307827 A1* | 11/2013 | Reisman | G06F 3/04815 345/175 |
| 2014/0168128 A1* | 6/2014 | Reisman | G06F 3/0488 345/173 |
| 2017/0287218 A1* | 10/2017 | Nuernberger | G06F 3/04845 |
| 2017/0344233 A1* | 11/2017 | Martensson | B67D 7/22 |

\* cited by examiner

*Primary Examiner* — Rodney Amadiz
(74) *Attorney, Agent, or Firm* — ANOVA LAW GROUP, PLLC

(57) ABSTRACT

A control method includes responding to a first trigger event to control a screen to display a set three-dimensional (3D) cubic space region, responding to an operation on the set 3D cubic space region to obtain adjustment information of the set 3D cubic space region, adjusting the set 3D cubic space region based on the adjustment information to obtain an adjusted 3D cubic space region, and controlling the screen to display the adjusted 3D cubic space region.

20 Claims, 6 Drawing Sheets

CONTROL METHOD AND DEVICE FOR DISPLAYING 3D IMAGES

CROSS-REFERENCE TO RELATED APPLICATION

The present disclosure claims priority to Chinese Patent Application No. 202210908023.7, filed on Jul. 29, 2022, the entire content of which is incorporated herein by reference.

TECHNICAL FIELD

The present disclosure relates to the display technology field and, more particularly, to a control method and a device.

BACKGROUND

Currently, 3D display technology is further advanced and is broadly applied to various electronic devices. However, user experience of existing 3D display functions of electronic devices is poor.

SUMMARY

Embodiments of the present disclosure provide a control method. The method includes responding to a first trigger event to control a screen to display a set three-dimensional (3D) cubic space region, responding to an operation on the set 3D cubic space region to obtain adjustment information of the set 3D cubic space region, adjusting the set 3D cubic space region based on the adjustment information to obtain an adjusted 3D cubic space region, and controlling the screen to display the adjusted 3D cubic space region.

Embodiments of the present disclosure provide an electronic device, including a memory and a processor. The memory stores an instruction set that, when executed by the processor, causes the processor to respond to a first trigger event to control a screen to display a set three-dimensional (3D) cubic space region, respond to an operation on the set 3D cubic space region to obtain adjustment information of the set 3D cubic space region, adjust the set 3D cubic space region based on the adjustment information to obtain an adjusted 3D cubic space region, and control the screen to display the adjusted 3D cubic space region.

Embodiments of the present disclosure provide a non-transitory computer-readable storage medium storing an instruction set that, when executed by the processor, causes the processor to respond to a first trigger event to control a screen to display a set three-dimensional (3D) cubic space region, respond to an operation on the set 3D cubic space region to obtain adjustment information of the set 3D cubic space region, adjust the set 3D cubic space region based on the adjustment information to obtain an adjusted 3D cubic space region, and control the screen to display the adjusted 3D cubic space region.

DETAILED DESCRIPTION OF THE EMBODIMENTS

The technical solutions of embodiments of the present disclosure are described in detail below in connection with the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

To further describe the purposes, features, and advantages of the present disclosure, the present disclosure is further described in detail in connection with the accompanying drawings and embodiments of the present disclosure.

Figure 1:
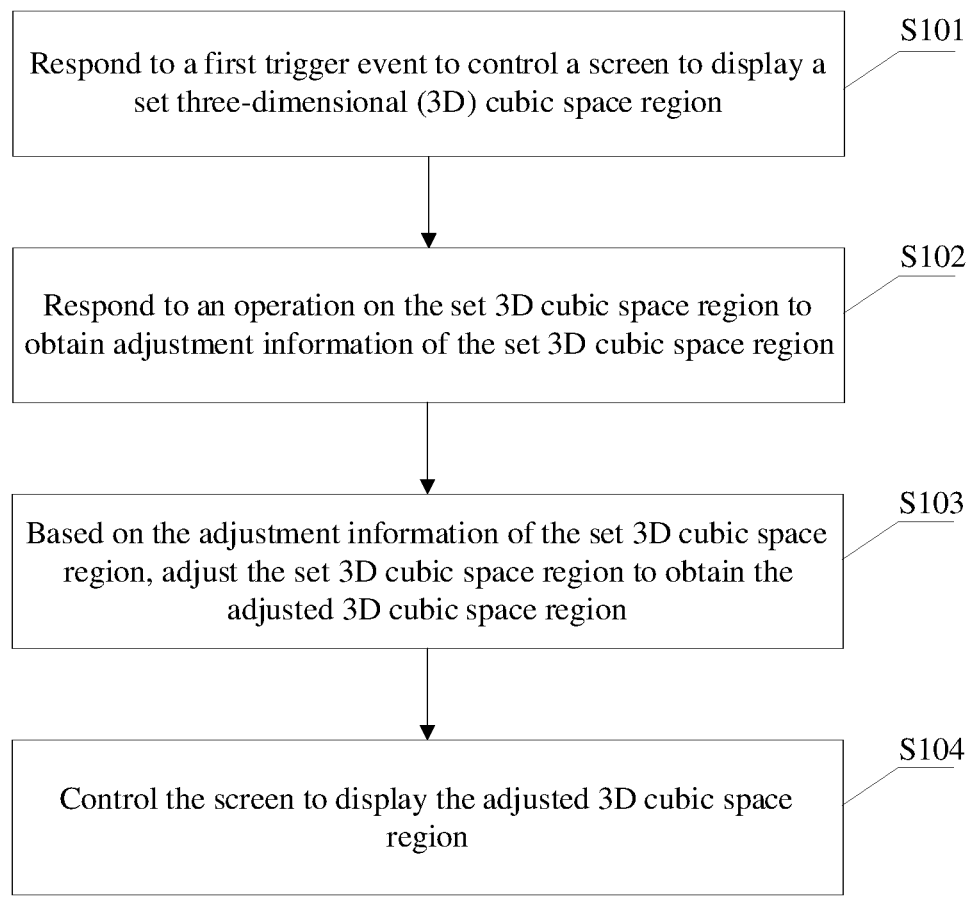
FIG. 1 illustrates a schematic flowchart of a control method according to some embodiments of the present disclosure.

FIG. 1 illustrates a schematic flowchart of a control method according to some embodiments of the present disclosure. The method can be applied to an electronic device. The product type of the electronic device is not limited by the present disclosure. As shown in FIG. 1, the method includes but is not limited to the following processes.

At S101, the electronic device responds to a first trigger event to control a screen to display a set three-dimensional (3D) cubic space region.

In some embodiments, the first trigger event can be used to indicate that the set 3D cubic space region needs to be adjusted. In some embodiments, the first trigger event can be generated or triggered by touching a specific position of a touch screen or a device button. The electronic device can be further configured to generate the first trigger event by tracking eyes. In some embodiments, if the electronic device determines that a relative position between the eyes and the screen satisfies a set condition, the electronic device can generate the first trigger event.

The set 3D cubic space region can include, but is not limited to, a set 3D cubic space region that can be seen with glasses or with naked eyes.

The electronic device can respond to the first trigger event to control the screen to display one or more set 3D cubic space regions.

At S102, the electronic device responds to an operation on the set 3D cubic space region to obtain adjustment information of the set 3D cubic space region.

A user can see the set 3D cubic space region displayed on the screen. For the user, the operation of the user can be performed on the set 3D cubic space region displayed on the screen.

The operation of the user on the set 3D cubic space region can include but is not limited to a volume adjustment operation and/or a shape adjustment operation. The volume adjustment operation can be performed to maintain the shape of the set 3D cubic space region unchanged and adjust the volume of the set 3D cubic space region. The shape adjustment operation can be performed to change the shape of the set 3D cubic space region.

When the operation of the user is the volume adjustment operation, process S102 further includes responding to the operation of the user being the volume adjustment operation on the set 3D cubic space region to obtain the adjustment information corresponding to the volume adjustment operation (S1021).

When the operation of the user is the shape adjustment operation, process S102 further includes responding to the operation of the user being the shape adjustment operation on the set 3D cubic space region to obtain the adjustment information corresponding to the shape adjustment operation (S1022).

When the operation of the user is the volume adjustment operation and the shape adjustment operation, process S102 further includes responding to the volume adjustment operation and shape adjustment operation on the set 3D cubic space region to obtain the adjustment information corresponding to the volume adjustment operation and the shape adjustment operation (S1023).

The user can perform the operation on the set 3D cubic space region based on an input object (such as a mouse or an input gesture). Accordingly, responding to the operation on the set 3D cubic space region to obtain the adjustment information of the set 3D cubic space region can include, but is not limited to responding to the operation on the set 3D cubic space region to obtain relative movement information of the input object that performs the operation (S1024).

In some embodiments, responding to the operation on the set 3D cubic space region to obtain the relative movement information of the input object that performs the operation can include, but is not limited to, responding to a movement operation on a first point, a first edge, or a first surface of the set 3D cubic space region to obtain the relative movement information of a related portion of the input object that performs the movement operation used to adjust the first point, the first edge, or the first surface (S10241).

In some embodiments, the user can perform the movement operation on the first point, the first edge, or the first surface of the set 3D cubic space region. The first point can represent a point in the set 3D cubic space region, the first edge can represent an edge in the set 3D cubic space region, and the first surface can represent a surface in the set 3D cubic space region.

In some embodiments, to meet a requirement of maintaining the shape of the set 3D cubic space region unchanged and adjusting the volume of the set 3D cubic space region, the user can perform a selection operation on the set 3D cubic space region and perform a first movement operation on the first point, the first edge, or the first surface of the selected set 3D cubic space region.

Accordingly, process S10241 can include in response to the first movement operation on the first point, the first edge, or the first surface of the selected set 3D cubic space region, obtaining the relative movement information of the input object that performs the first movement operation for zooming out or in the set 3D cubic space region.

To meet the requirement of changing the shape of the set 3D cubic space region, the user can perform the selection operation on the first point, the first edge, or the first surface of the 3D cubic space region and perform a second movement operation on the first point, the first edge, or the first surface that is in a selected state within the 3D cubic space region.

Accordingly, process S10241 can further include in response to the second movement operation on the first point, the first edge, or the first surface that is in a selected state within the 3D cubic space region, obtaining the relative movement information of the input object that performs the second movement operation for changing the shape of the set 3D cubic space region.

In some embodiments, when the screen displays a plurality of set 3D cubic space regions, the user can select one set 3D cubic space region from the plurality of set 3D cubic space regions to perform the operation or perform the same operation on the plurality of set 3D cubic space regions simultaneously.

At S103, based on the adjustment information of the set 3D cubic space region, the set 3D cubic space region is adjusted to obtain the adjusted 3D cubic space region.

Process S103 can include, but is not limited to, the following sub-processes.

At S1031, based on the adjustment information of the set 3D cubic space region, adjustment information of a 2D image corresponding to the set 3D cubic space region is determined.

Corresponding to process S1024, process S103 can include but is not limited to based on the relative movement information of the input object that performs the operation, determining the adjustment information of the 2D image corresponding to the set 3D cubic space region.

At S1032, based on the adjustment information of the corresponding 2D image of the set 3D cubic space region, the adjusted 2D image is obtained, and based on the mapping relationship between the 2D image and the 3D cubic space region, the 3D cubic space region corresponding to the adjusted 2D image is obtained.

The 3D cubic space region corresponding to the adjusted 2D image is the adjusted 3D cubic space region.

For example, if the selected set 3D cubic space region is a 3D cubic space region with 3 m edges as shown in FIG. 2A, the user can perform the first movement operation on vertex A of the selected set 3D cubic space region. The electronic device can respond to the first movement operation to obtain the relative movement information of the input object that performs the first movement operation for zooming out the 3D cubic space region. Based on the relative movement information for zooming out the 3D cubic space region, the electronic device can determine the adjustment information of the 2D image corresponding to the 3D cubic space region, zoom out the 2D image based on the adjustment information of the 2D image corresponding to the set 3D cubic space region to obtain the zoomed out 2D image, and obtain the 3D cubic space region corresponding to the zoomed out 2D image shown in FIG. 2B based on the mapping relationship between the 2D image and the 3D cubic space region.

In some other embodiments, if the set 3D cubic space region is the 3D cubic space region with 3-meter edges as shown in FIG. 3A, and the first surface including vertices A, B, C, and D of the 3D cubic space region is selected, the second movement operation can be performed on the selected first surface. The electronic device can be configured to respond to the second movement operation to obtain the relative movement information of the input object that performs the second movement operation for changing the shape of the 3D cubic space region. Based on the relative movement information for changing the shape of the 3D cubic space region, the electronic device can be configured to determine the adjustment information of the 2D image corresponding to the set 3D cubic space region. Based on the adjustment information of the 2D image corresponding to the set 3D cubic space region, the electronic device can be configured to change the shape of the 2D image to obtain the 2D image with the changed shape. Based on the mapping relationship between the 2D image and the 3D cubic space region, the electronic device can be configured to obtain the 3D rectangular space region shown in FIG. 3B.

Figure 2:
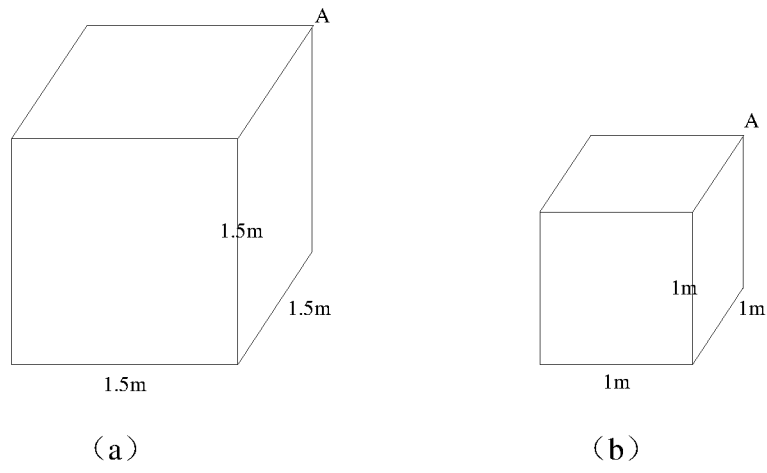
FIG. 2 illustrates a schematic diagram showing an adjustment scene of setting a 3D cubic space area according to some embodiments of the present disclosure.
Figure 3:
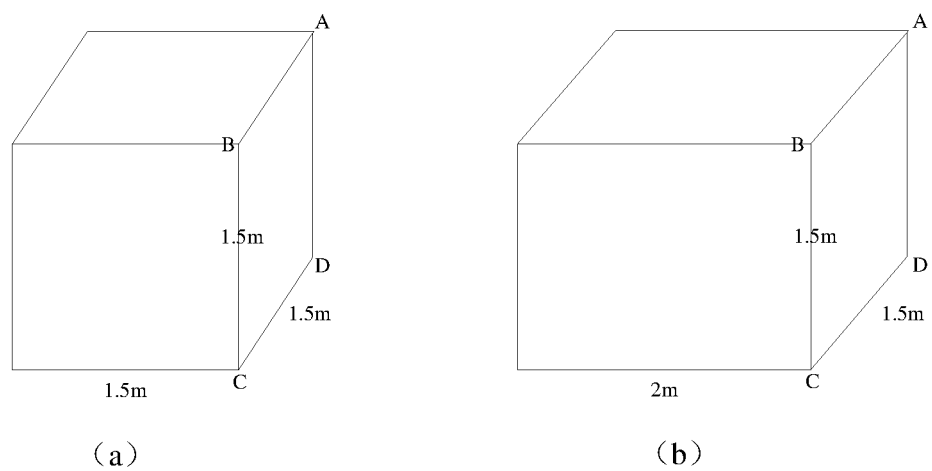
FIG. 3 illustrates a schematic diagram showing another adjustment scene of setting a 3D cubic space area according to some embodiments of the present disclosure.

FIG. 2 and FIG. 3 are merely exemplary and do not limit the set 3D cubic space region and the adjusted 3D cubic space region.

At S104, the screen is controlled to display the adjusted 3D cubic space region.

In some embodiments, a triggering method for using the adjusted 3D cubic space region can be set. The triggering method is not limited. For example, the triggering method can include inputting a confirmation instruction by the user to the electronic device. The electronic device can respond to the confirmation instruction to control the adjusted 3D cubic space region to be in an application state.

In some embodiments, by responding to a first trigger event, the electronic device can control the screen to display the set 3D cubic space region. By responding to the operation on the set 3D cubic space region, the electronic device can be configured to obtain the adjustment information of the set 3D cubic space region. Based on the adjustment information of the set 3D cubic space region, the electronic device can be configured to adjust the set 3D cubic space region to obtain the adjusted 3D cubic space region and control the screen to display the adjusted 3D cubic space region to realize a user-interactive adjustment of the 3D cubic space region. Thus, the electronic device can provide 3D display services based on the 3D cubic space region obtained through the user-interactive adjustment to improve the user experience of the 3D display function.

Figure 4:
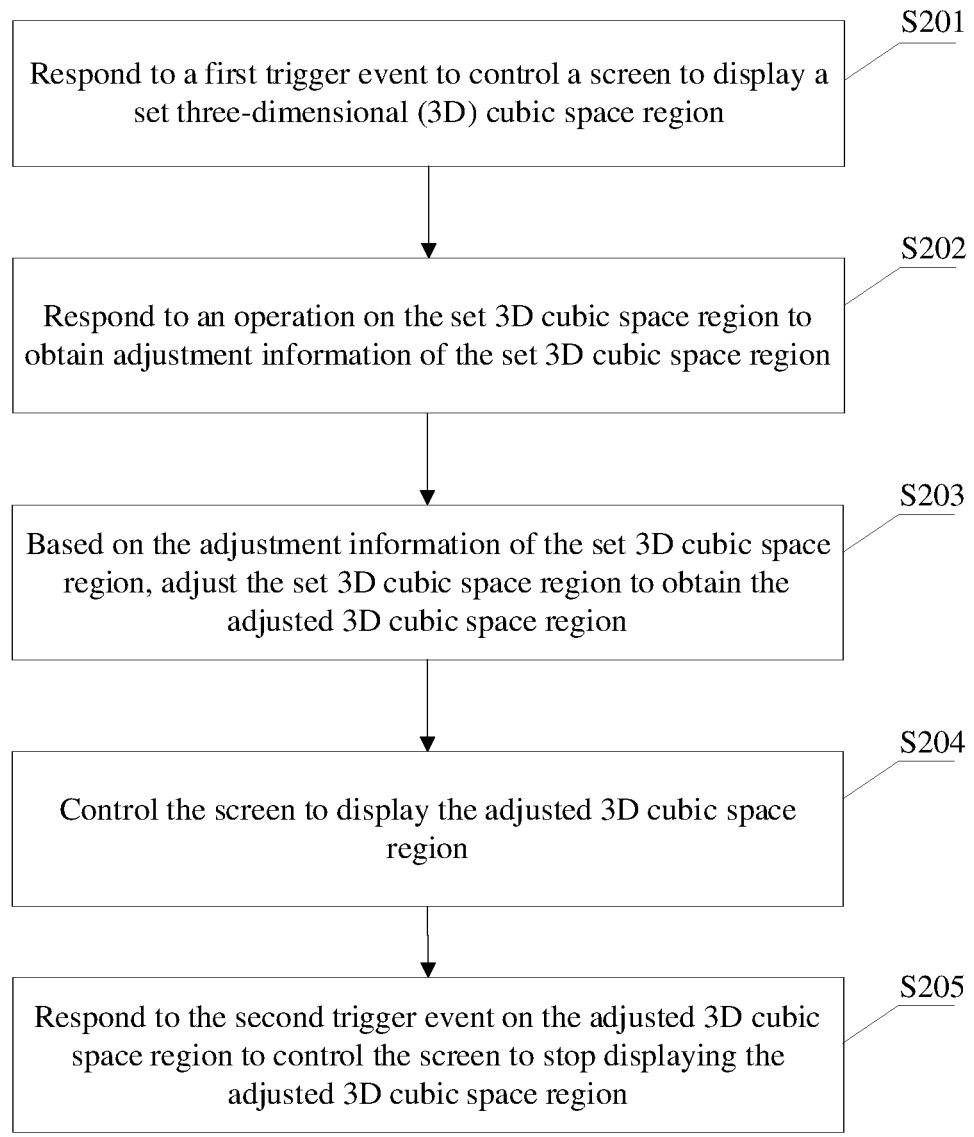
FIG. 4 illustrates a schematic flowchart of a control method according to some embodiments of the present disclosure.

In some other embodiments of the present disclosure, FIG. 4 illustrates a schematic flowchart of a control method according to some embodiments of the present disclosure. The control method is mainly an extension of the control method described above. The method can include but is not limited to responding to the first trigger event to control the screen to display the set 3D cubic space region (S201), responding to the operation performed on the set 3D cubic space region to obtain the adjustment information of the set 3D cubic space region (S202), based on the adjustment information of the set 3D cubic space region, adjusting the set 3D cubic space region to obtain the adjusted 3D cubic space region (S203), controlling the display screen to display the adjusted 3D cubic space region, and responding to the second trigger event on the adjusted 3D cubic space region to control the screen to stop displaying the adjusted 3D cubic space region (S205).

For a detailed description of processes S201 to S204, reference can be made to the relevant description of processes S101 to S104, which is not repeated here.

In some embodiments, the second trigger event can be used to indicate that the screen needs to stop displaying the adjusted 3D cubic space region. In some embodiments, the second trigger event can be generated or triggered through a specific position on the touch screen or the device button. In some other embodiments, the electronic device can generate the first trigger event after a display time length of the adjusted 3D cubic space region reaches a determined time.

In some embodiments, by responding to the first trigger event, the electronic device can control the screen to display the set 3D cubic space region. The electronic device can respond to the operation performed on the set 3D cubic space region to obtain the adjustment information of the set 3D cubic space region. Based on the adjustment information of the set 3D cubic space region, the electronic device can adjust the set 3D cubic space region to obtain the adjusted 3D cubic space region. Then, the electronic device can control the screen to display the adjusted 3D cubic space region to realize the user-interactive adjustment of the 3D cubic space region. Thus, the electronic device can provide 3D display services based on the 3D cubic space region obtained through the user-interactive adjustment to improve the user experience of the 3D display function.

Furthermore, the electronic device can respond to the second trigger event for the adjusted 3D cubic space region to control the screen to stop displaying the adjusted 3D cubic space region to reduce the impact on displaying other contents on the display screen.

Figure 5:
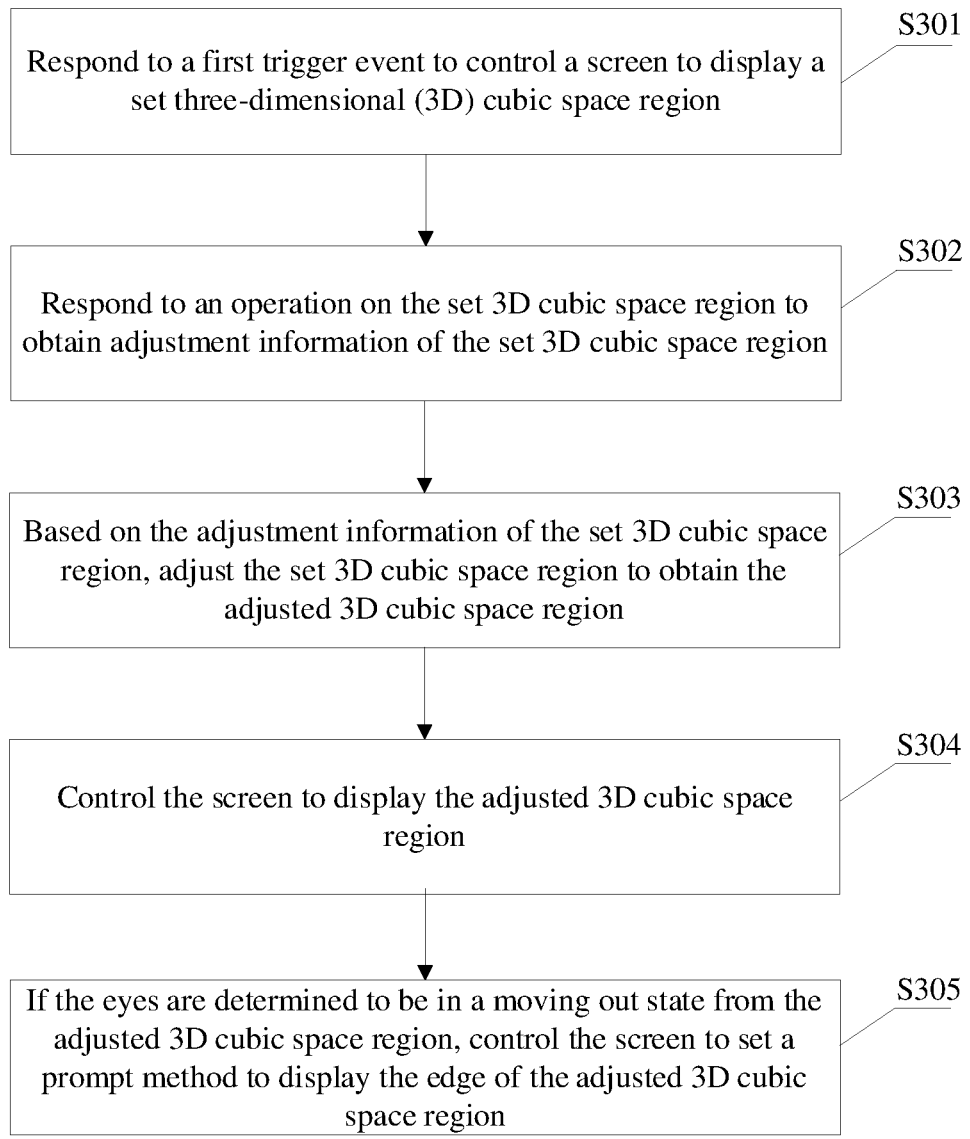
FIG. 5 illustrates a schematic flowchart of a control method according to some embodiments of the present disclosure.

In some other embodiments of the present disclosure, FIG. 5 illustrates a schematic flowchart of a control method according to some embodiments of the present disclosure. The method is mainly an extension of the control method described above. The method can include, but is not limited to, responding to the first trigger event to control the screen to display the set 3D cubic space region (S301), responding to the operation performed on the set 3D cubic space region to obtain the adjustment information of the set 3D cubic space region (S302), based on the adjustment information of the set 3D cubic space region, adjusting the set 3D cubic space region to obtain the adjusted 3D cubic space region (S303), controlling the display screen to display the adjusted 3D cubic space region (S304), and if the eyes are determined to be in a moving out state from the adjusted 3D cubic space region, controlling the screen to set a prompt method to display the edge of the adjusted 3D cubic space region (S305).

For a detailed description of processes S301 to S304, reference can be made to the relevant description of processes S101 to S104, which is not repeated here.

In some embodiments, controlling the screen to set the prompt method to display the edge of the adjusted 3D cubic space region can include, but is not limited to, controlling the screen to display the edge of the adjusted 3D cubic space region in a set color (S3051).

In some other embodiments, controlling the screen to set the prompt method to display the edge of the adjusted 3D cubic space region can include, but is not limited to, controlling the screen to display the edge of the adjusted 3D cubic space region in a set animation effect (S3052).

In some other embodiments, controlling the screen to set the prompt method to display the edge of the adjusted 3D cubic space region can include, but is not limited to, controlling the screen to display the edge of the adjusted 3D cubic space region in the set color and the set animation effect (S3053).

Controlling the screen to display the edge of the adjusted 3D cubic space region in the set color can also include, but is not limited to, based on the change information of the distance between the eyes and the adjusted 3D cubic space region, controlling the screen to display the edge of the adjusted 3D cubic space region in a set gradually changing prompt method (S3054).

The set gradually changing prompt method is not limited in the present disclosure. For example, the set gradually changing prompt method can include but is not limited to a set color gradually changing prompt method or a set brightness gradually changing prompt method.

Controlling the screen to display the edge of the adjusted 3D cubic space region in the set gradually changing prompt method based on the changing information of the distance between the eyes and the adjusted 3D cubic space region can also include, but is not limited to, based on the changing information of the distance between the eyes and the edge of the adjusted 3D cubic space region, determining the eyes to be in the state close to the edge of the adjusted 3D cubic space region, controlling the screen to display the edge of the adjusted 3D cubic space region in a prompt method of gradually changing from a first brightness to a second brightness, the second brightness being different from the first brightness, and/or based on the changing information of the distance between the eyes and the edge of the adjusted 3D cubic space region, determining the eyes to be in the state close to the edge of the adjusted 3D cubic space region, controlling the screen to display the edge of the adjusted 3D cubic space region in the prompt method of gradually changing from a first color to a second color, the second color being different from the first color.

This process is not limited to being performed after process S304 and can also be performed after step S205.

In some embodiments, by responding to the first trigger event, the electronic device can control the screen to display the set 3D cubic space region. The electronic device can respond to the operation performed on the set 3D cubic space region to obtain the adjustment information of the set 3D cubic space region, adjust the set 3D cubic space region based on the adjustment information of the set 3D cubic space region to obtain the adjusted 3D cubic space region, and control the screen to display the adjusted 3D cubic space region to realize the user-interactive adjustment of the 3D cubic space region. Thus, the electronic device can provide 3D display services based on the 3D cubic space region obtained through the user-interactive adjustment to improve the user experience of the 3D display function.

Moreover, if the eyes are determined to be in the state of moving out of the adjusted 3D cubic space region, the electronic device can control the screen to display the edge of the adjusted 3D cubic space region in the set prompt method to effectively prompt the user to be in the state of moving out of the adjusted 3D cubic space region to allow the user to timely adjust the relative position with the display screen as needed.

Controlling the screen to display the edge of the adjusted 3D cubic space region in a set gradually changing prompt method can enhance a visual prompt-changing effect and further improve the user experience.

Figure 6:
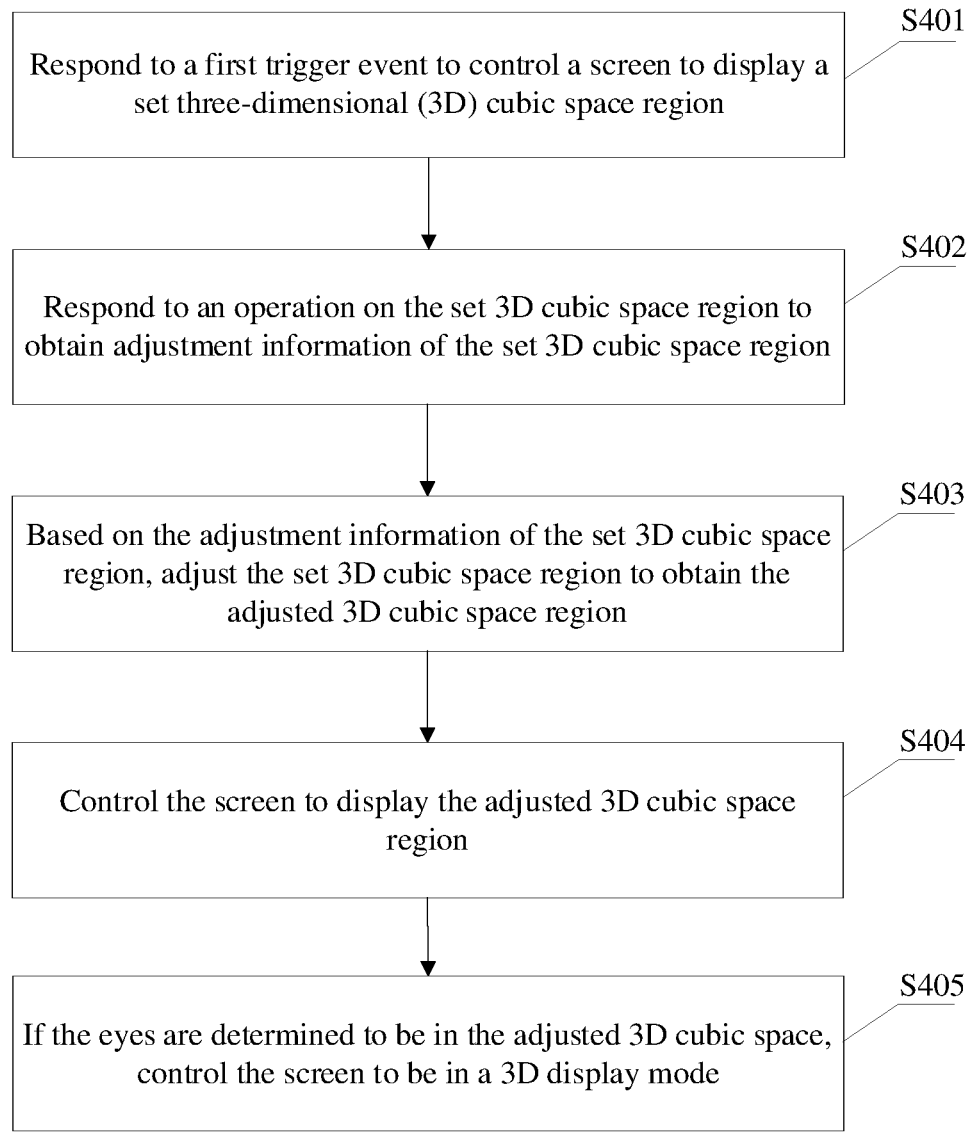
FIG. 6 illustrates a schematic flowchart of a control method according to some embodiments of the present disclosure.

In some other embodiments of the present disclosure, FIG. 6 illustrates a schematic flowchart of a control method according to some embodiments of the present disclosure. The method is merely an expansion of the control method above. The method includes, but is not limited to, responding to the first trigger event to control the screen to display the set 3D cubic space region (S401), responding to the operation performed on the set 3D cubic space region to obtain the adjustment information of the set 3D cubic space region (S402), based on the adjustment information of the set 3D cubic space region, adjusting the set 3D cubic space region to obtain the adjusted 3D cubic space region (S403), controlling the display screen to display the adjusted 3D cubic space region (S404), and if the eyes are determined to be in the adjusted 3D cubic space, controlling the screen to be in a 3D display mode (S405).

For a detailed description of processes S401 to S404, reference can be made to the relevant description of processes S101 to S104, which is not repeated here.

In some embodiments, eye-tracking technology can be used to track the eyes. If the eyes are determined to be in the adjusted 3D cubic space region, the electronic device can control the screen to be in the 3D display mode.

When the screen is in the 3D display mode, the screen can display a 3D image correspondingly.

In some embodiments, by responding to the first trigger event, the electronic device can control the display screen to display the set 3D cubic space region. The electronic device can respond to the operation performed on the set 3D cubic space region to obtain the adjustment information of the set 3D cubic space region, adjust the set 3D cubic space region based on the adjustment information of the set 3D cubic space region to obtain the adjusted 3D cubic space region, and control the screen to display the adjusted 3D cubic space region to realize the user-interactive adjustment of the 3D cubic space region. Thus, the electronic device can provide 3D display services based on the 3D cubic space region obtained through the user-interactive adjustment to improve the user experience of the 3D display function.

Moreover, if the eyes are determined to be in the adjusted 3D cubic space region, the electronic device can control the screen to be in the 3D display mode to ensure the user viewing experience.

Then, the present disclosure further provides a control device. The control device described below can correspondingly refer to the information processing method described above.

Figure 7:
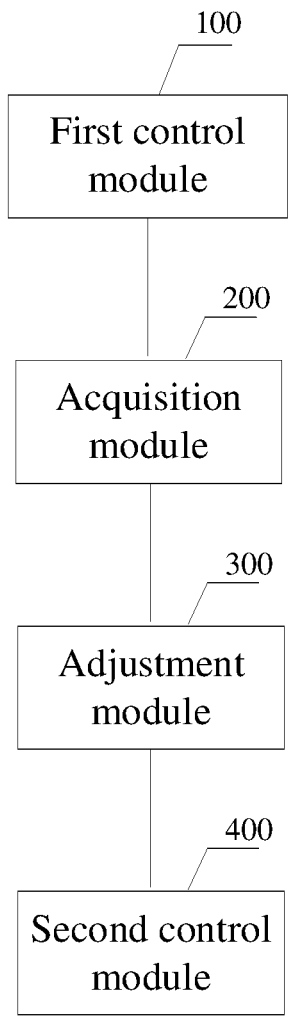
FIG. 7 illustrates a schematic structural diagram of a control device according to some embodiments of the present disclosure.

As shown in FIG. 7, the control device includes a first control module 100, an acquisition module 200, an adjustment module 300, and a second control module 400.

The first control module 100 can be configured to respond to the first trigger event to control the screen to display the set 3D cubic space region.

The acquisition module 200 can be configured to respond to the operation performed on the set 3D cubic space region to obtain the adjustment information of the set 3D cubic space region.

The adjustment module 300 can be configured to adjust the set 3D cubic space region based on the adjustment information to obtain the adjusted 3D cubic space region.

The second control module 400 can be configured to control the screen to display the adjusted 3D cubic space region.

In some embodiments, the acquisition module 200 can be further configured to respond to the operation performed on the set 3D cubic space region to obtain the relative movement information of the input object that performs the operation.

In some embodiments, responding to the operation performed on the set 3D cubic space region to obtain the relative movement information of the input object that performs the operation by the acquisition module 200 can include responding to the movement operation of the first point, the first edge, or the first surface of the set 3D cubic space region to obtain the relative movement information of the input object that performs the movement operation for adjusting the relevant portion with the first point, the first edge, or the first surface.

In some embodiments, the acquisition module 200 can be further configured to respond to the volume adjustment operation performed on the set 3D cubic space region to obtain the adjustment information corresponding to the volume adjustment operation, the volume adjustment operation being used to maintain the shape of the set 3D cubic space region and adjust the volume of the set 3D cubic space region, and/or respond to the shape adjustment operation performed on the set 3D cubic space region to obtain the adjustment information corresponding to the shape adjustment operation, the shape adjustment operations being used to change the shape of the set 3D cubic space region.

In some embodiments, the control device can further include a third control module configured to respond to the second trigger event on the adjusted 3D cubic space region to control the screen to stop displaying the adjusted 3D cubic space region.

In some embodiments, the control device can further include a fourth control module configured to, if the eyes are determined to be in the state of moving out of the adjusted 3D cubic space region, control the screen to display the edge of the adjusted 3D cubic space region in the set prompt method.

In some embodiments, controlling the screen to display the edge of the adjusted 3D cubic space region in the set prompt method by the fourth control module can include controlling the screen to display the edge of the adjusted 3D cubic space region in the set gradually changing prompt method based on the change information of the distance between the eyes and the edge of the adjusted 3D cubic space region.

In some embodiments, controlling the screen to display the edge of the adjusted 3D cubic space region in the set prompt method by the fourth control module can include controlling the screen to display the edge of the adjusted 3D cubic space region in the set color, and/or controlling the screen to display the edge of the adjusted 3D cubic space region in the set animation effect.

In some embodiments, the control device can further include a fifth control module configured to, if the eyes are determined to be in the adjusted 3D cubic space region, control the screen to be in the 3D display mode.

Corresponding to the control method of embodiments of the present disclosure, the present disclosure further provides an electronic device applying the control method.

Figure 8:
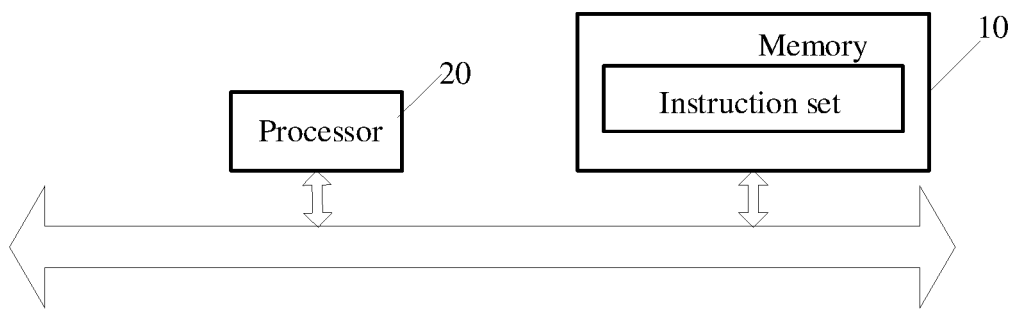
FIG. 8 illustrates a schematic structural diagram of a control device according to some embodiments of the present disclosure.

FIG. 8 illustrates a schematic structural diagram of a control device according to some embodiments of the present disclosure.

The electronic device includes one or more memories 10 and one or more processors 20.

The one or more memories 10 can be used to store at least one instruction set.

The one or more processors 20 can be configured to call and execute the instruction set stored in the one or more memories 10 and perform the control method above by executing the instruction set.

Corresponding to the control method of embodiments of the present disclosure, the present disclosure further provides a storage medium.

In embodiments of the present disclosure, the storage medium can store the computer program for implementing the control method of embodiments of the present disclosure. The computer program can be executed by the processor to realize the control method of embodiments of the present disclosure.

Each embodiment focuses on the differences from other embodiments, and the same or similar parts among embodiments of the present disclosure can be referred to each other. For device embodiments, since they are generally similar to method embodiments, the descriptions are relatively simple, and relevant aspects can be referred to the descriptions of method embodiments.

Finally, in the specification, relational terms such as first and second are used merely to distinguish one entity or operation from another entity or operation, and do not necessarily imply any actual relationship or sequence between these entities or operations. Furthermore, terms such as "including," "comprising," or any other variant thereof are intended to encompass non-exclusive inclusion, such that a process, method, article, or device that includes a series of elements includes not only those elements explicitly listed, but also other elements that are not explicitly listed but are inherently present in such process, method, article, or device. Unless otherwise specified, an element limited by the phrase "including a . . . " does not exclude the presence of an additional identical element in the process, method, article, or device that includes the element.

To facilitate description, the device is described by dividing the functions into various modules for description separately. In embodiments of the present disclosure, the functions of the modules can be realized in a same or a plurality of software and/or hardware modules.

Based on the above description, those skilled in the art can clearly understand that the present disclosure can be implemented by the software with a necessary general hardware platform. Based on such understanding, the technical solutions of the present disclosure, or the portion of the present disclosure that contributes to the existing technology can be embodied in the form of a software product. The software product can be stored in the storage medium such as ROM/RAM, a disk, or a CD. The software product can include a plurality of instructions to cause a computer device (e.g., a personal computer, server, or network device) to execute the methods described in various embodiments or certain portions of embodiments of the present disclosure.

The control method and the device of embodiments of the present disclosure are described in detail above. Specific examples are used in the specification to describe the principle and implementation of the present disclosure in detail. The description of embodiments of the present disclosure can be only used to help understand the method of the present disclosure and the core ideas. Meanwhile, for those skilled in the art, according to the concept of the present disclosure, changes can be made to implementations and application scopes. In summary, the content of the present specification does not limit the scope of the present disclosure.

What is claimed is:

1. A control method comprising:
   responding to a first trigger event to control a screen to display a plurality of set three-dimensional (3D) cubic space regions;
   responding to an operation on at least one set 3D cubic space region selected by a user from the plurality of set 3D cubic space regions to obtain adjustment information of the at least one set 3D cubic space region;
   adjusting the at least one set 3D cubic space region based on the adjustment information to obtain at least one adjusted 3D cubic space region each corresponding to one of the at least one set 3D cubic space region;
   controlling the screen to display the at least one adjusted 3D cubic space region; and
   in response to determining that eyes are in the at least one adjusted 3D cubic space region, controlling the screen to be in a 3D display mode.

2. The method according to claim 1, wherein responding to the operation on the at least one set 3D cubic space region to obtain the adjustment information of the at least one set 3D cubic space region includes:

responding to the operation on the at least one set 3D cubic space region to obtain relative movement information of an input object that performs the operation.

3. The method according to claim 2, wherein responding to the operation on the at least one set 3D cubic space region to obtain the relative movement information of the input object that performs the operation includes:
responding to a movement operation on a first point, a first edge, or a first surface of the at least one set 3D cubic space region to obtain the relative movement information of the input object for adjusting a relevant portion of the first point, the first edge, or the first surface.

4. The method according to claim 1, wherein responding to the operation on the at least one set 3D cubic space region to obtain the adjustment information of the at least one set 3D cubic space region includes:
responding to a volume adjustment operation on the at least one set 3D cubic space region to obtain the adjustment information corresponding to the volume adjustment operation, wherein the volume adjustment operation is performed to maintain a shape of the at least one set 3D cubic space region while adjusting a volume of the at least one set 3D cubic space region.

5. The method according to claim 1, further comprising:
responding to a second trigger event on the at least one adjusted 3D cubic space region to control the screen to stop displaying the at least one adjusted three-dimensional cubic space region.

6. The method according to claim 1, further comprising:
in response to determining that eyes are in a state of moving out of the at least one adjusted 3D cubic space region, controlling the screen to display an edge of the at least one adjusted 3D cubic space region in a set prompt method.

7. The method according to claim 6, wherein in response to determining that the eyes are in the state of moving out of the at least one adjusted 3D cubic space region, controlling the screen to display the edge of the at least one adjusted 3D cubic space region in the set prompt method includes:
in response to determining that the eyes are in the state of moving out of the at least one adjusted 3D cubic space region, based on change information of a distance between the eyes and the edge of the at least one adjusted 3D cubic space region, controlling the screen to display the edge of the at least one adjusted 3D cubic space region in a set gradually changing prompt method.

8. The method according to claim 7, wherein the set gradually changing prompt method includes at least one of a set color gradually changing prompt method or a set brightness gradually changing prompt method.

9. The method according to claim 8, wherein based on change information of a distance between the eyes and the edge of the at least one adjusted 3D cubic space region, controlling the screen to display the edge of the at least one adjusted 3D cubic space region in the set gradually changing prompt method includes:
based on the change information of the distance between the eyes and the edge of the at least one adjusted 3D cubic space region, determining that the eyes being in a state of being close to the edge; and
at least one of:
controlling the screen to display the edge of the at least one adjusted 3D cubic space region in a prompt method of gradually changing from a first brightness to a second brightness, the second brightness being different from the first brightness; or
controlling the screen to display the edge of the at least one adjusted 3D cubic space region in the prompt method of gradually changing from a first color to a second color, the second color being different from the first color.

10. The method according to claim 6, wherein controlling the screen to display the edge of the at least one adjusted 3D cubic space region in the set prompt method includes:
controlling the screen to display the edge of the at least one adjusted 3D cubic space region in a set color; and/or
controlling the screen to display the edge of the at least one adjusted 3D cubic space region in a set animation effect.

11. The method according to claim 1, wherein responding to the operation on the at least one set 3D cubic space region to obtain the adjustment information of the at least one set 3D cubic space region includes:
responding to a shape adjustment operation on the at least one set 3D cubic space region to obtain the adjustment information corresponding to the shape adjustment operation, wherein the shape adjustment operation is performed to change a shape of the at least one set 3D cubic space region.

12. The method according to claim 1, further comprising:
performing a same operation on the plurality of set 3D cubic space regions simultaneously.

13. An electronic device comprising:
a processor; and
a memory storing an instruction set that, when executed by the processor, causes the processor to:
respond to a first trigger event to control a screen to display a plurality of set three-dimensional (3D) cubic space regions;
respond to an operation on at least one set 3D cubic space region selected by a user from the plurality of set 3D cubic space regions to obtain adjustment information of the at least one set 3D cubic space region;
adjust the at least one set 3D cubic space region based on the adjustment information to obtain at least one adjusted 3D cubic space region each corresponding to one of the at least one set 3D cubic space region;
control the screen to display the at least one adjusted 3D cubic space region; and
in response to determining that eyes are in the at least one adjusted 3D cubic space region, control the screen to be in a 3D display mode.

14. The device according to claim 13, wherein the instruction set further causes the processor to:
respond to the operation on the at least one set 3D cubic space region to obtain relative movement information of an input object that performs the operation.

15. The device according to claim 14, wherein the instruction set further causes the processor to:
respond to a movement operation on a first point, a first edge, or a first surface of the at least one set 3D cubic space region to obtain the relative movement information of the input object for adjusting a relevant portion of the first point, the first edge, or the first surface.

16. The device according to claim 13, wherein the instruction set further causes the processor to:
respond to a volume adjustment operation on the at least one set 3D cubic space region to obtain the adjustment information corresponding to the volume adjustment operation, wherein the volume adjustment operation is performed to maintain a shape of the at least one set 3D cubic space region while adjusting a volume of the at least one set 3D cubic space region; and/or respond to a shape adjustment operation on the at least one set 3D cubic space region to obtain the adjustment information corresponding to the shape adjustment operation, wherein the shape adjustment operation is performed to change a shape of the at least one set 3D cubic space region.

17. The device according to claim 13, wherein the instruction set further causes the processor to:

respond to a second trigger event on the at least one adjusted 3D cubic space region to control the screen to stop displaying the at least one adjusted three-dimensional cubic space region.

18. The device according to claim 13, wherein the instruction set further causes the processor to:

in response to determining that eyes are in a state of moving out of the at least one adjusted 3D cubic space region, control the screen to display an edge of the at least one adjusted 3D cubic space region in a set prompt method.

19. The device according to claim 18, wherein the instruction set further causes the processor to:

based on change information of a distance between the eyes and the edge of the at least one adjusted 3D cubic space region, control the screen to display the edge of the at least one adjusted 3D cubic space region in a set gradually changing prompt method.

20. A non-transitory computer-readable storage medium storing an instruction set that, when executed by a processor, causes the processor to:

Respond to a first trigger event to control a screen to display a plurality of set three-dimensional (3D) cubic space regions;

respond to an operation on at least one set 3D cubic space region selected by a user from the plurality of set 3D cubic space regions to obtain adjustment information of the at least one set 3D cubic space region;

adjust the at least one set 3D cubic space region based on the adjustment information to obtain at least one adjusted 3D cubic space region each corresponding to one of the at least one set 3D cubic space region;

control the screen to display the at least one adjusted 3D cubic space region; and in response to determining that eyes are in the at least one adjusted 3D cubic space region, control the screen to be in a 3D display mode.

* * * * *